United States Patent [19]

Kimura et al.

[11] Patent Number: 5,153,243

[45] Date of Patent: Oct. 6, 1992

[54] ACETAL RESIN COMPOSITION

[75] Inventors: Masaharu Kimura, Hiratsuka; Naohiko Tsujimoto, Yokohama, both of Japan

[73] Assignee: Mitsubishi Gas Chemical Company, Inc., Tokyo, Japan

[21] Appl. No.: 643,933

[22] Filed: Jan. 22, 1991

[30] Foreign Application Priority Data

Jan. 22, 1990 [JP] Japan .................................. 2-12201

[51] Int. Cl.[5] ...................... C08L 97/02; C08L 1/00; C08K 5/13; C08K 5/34
[52] U.S. Cl. ...................... 524/13; 524/34; 524/35; 524/72; 524/100
[58] Field of Search ...................... 524/13, 34, 35, 72

[56] References Cited

U.S. PATENT DOCUMENTS

| | | | |
|---|---|---|---|
| 3,406,129 | 9/1968 | Price | 524/41 |
| 4,248,743 | 3/1981 | Goettler | 524/13 |
| 4,596,845 | 6/1986 | Koyama et al. | 524/35 |
| 4,598,110 | 7/1986 | Koyama et al. | 524/34 |

FOREIGN PATENT DOCUMENTS 0238237 9/1987 European Pat. Off. .
8704476 7/1987 World Int. Prop. O. .

Primary Examiner—Kriellion S. Morgan
Assistant Examiner—Peter Szekely
Attorney, Agent, or Firm—Wenderoth, Lind & Ponack

[57] ABSTRACT

An acetal resin composition comprising an intimate mixture containing an acetal resin and ligneous pulp. This composition gives a molded article having excellent mechanical strength, heat resistance and fire retardancy.

5 Claims, No Drawings

ACETAL RESIN COMPOSITION

DETAILED DESCRIPTION OF THE INVENTION

This invention relates to an acetal resin composition. More specifically, this invention relates to an acetal resin composition which contains pulp and gives a molded article having excellent mechanical strength, heat resistance and fire retardancy.

An acetal resin is a mass-producible and inexpensive thermoplastic resin, and it is excellent in mechanical strength, heat resistance and chemical resistance. It is therefore favorably used in many industrial fields in which metal materials have been generally used, i.e. as a raw material for various mechanical parts such as bearings, gears, etc., and for a part and component for use in an automobile, a precision machine, an electric or electronic appliance, a construction member, etc.

However, an acetal resin has defects in that it is liable to undergo deflection, thermal deformation, etc., when used as a mechanical part at a high temperature or under stress for a long period of time.

It is general practice to overcome the above defects by incorporating an inorganic filler such as a glass fiber, talc, etc., into an acetal resin molding material. However, the incorporation of such a filler causes new crucial defects in that not only the molded article appearance is seriously deteriorated but also, when an acetal resin containing such a filler is molded into a slide member such as bearings, a gear, a cam, etc., the abrasion of a part in contact with said slide member increases.

The acetal resin further has a fatal defect in that it is easily melted to drip and is easily combustible. This defect cannot be overcome by incorporating an inorganic filler into the acetal resin. That is, the incorporation of an inorganic filler into the acetal resin hardly has an effect on inhibition and prevention of the dripping of the resin, i.e. falling of the molten resin in drops, although the resin is improved in rigidity, strength and heat resistance. A method has been proposed which comprises incorporating a fire retardant such as red phosphorus, etc. However, depending upon a fire retardant or an amount thereof, a sufficient fire retarding effect cannot always be obtained. Further, some fire retardants impair excellent properties of the acetal resin. Therefore, crucial technical problem of imparting fire retardancy to the acetal resin or improving fire retardancy of the acetal resin still remains to be solved.

Meanwhile, there is known a composition in which the surface gloss of the acetal resin is improved.

Japanese Laid-Open Patent Publication No. 135552/1981 discloses a composition obtained by melt-mixing a modified wood powder, in which an organic group having not less than 3 carbon atoms is preliminarily introduced into at least part of hydroxyl groups of the wood, with a thermoplastic resin such as plyoxymethylene. In this case, a composition having surface gloss or surface glossiness can be obtained by mixing the modified wood powder with a heat-meltable resin.

Japanese Laid-open Patent Publication No. 103804/1982 discloses a "thermoplastic modified wood" produced by introducing at least an organic group into part of hydroxyl groups. This Publication describes that said thermoplastic modified wood has improved affinity for a thermoplastic resin and gives a composition in which it is very homogeneously dispersed in a thermoplastic resin.

Japanese Laid-open Patent Publication No. 225658/1988 discloses a composition comprising a plasticized wood prepared by introducing a phenyl-containing organic group into part or all of hydroxyl groups by means of esterification or etherification treatment and a thermoplastic synthetic polymer such as a polyoxymethylene polymer, etc. It is also described that this composition is a homogeneous mixture with an improved surface texture.

It is an object of this invention to provide a novel acetal resin composition.

It is another object of this invention to provide an acetal resin composition having stable mechanical properties, excellent heat resistance and good fire retardancy.

Other objects and advantages of this invention will be apparent from the following description.

According to this invention, the above objects and advantages of this invention can be achieved by an acetal resin composition comprising an intimate mixture containing an acetal resin and ligneous pulp.

A study by the present inventors has showed that the incorporation of a glass fiber, a carbon fiber, etc., generally used as a filler or a reinforcing material, into an acetal resin improves rigidity, strength and heat resistance, but hardly has an improved effect on inhibition or prevention of combustion dripping of the resin component.

And, the composition of this invention has been found to have an improvement on a combustion dripping phenomenon as well as a remarkable fire retardancy.

The effect on inhibition and prevention of a dripping phenomenon of the acetal resin becomes more remarkable with an increase in the amount of ligneous pulp. Although the mechanism of the above effect has not yet been fully clarified, it is assumed that the mechanism is closely related to a steric molecular structure of the ligneous pulp.

Any known acetal resins can be used as the acetal resin of this invention, and for example, it can be selected from a polyacetal homopolymer and a polyacetal copolymer in which not less than 50% of the main chain is composed of an oxymethylene chain. It can be also selected from modified products obtained by crosslinking or graft-polymerizing such polyacetals according to a known method.

The ligneous pulp used in this invention means a material of a cellulose or lignocellulose type, and can be selected, for example, from dissolving pulp, chemical pulp, semichemical pulp, mechanical pulp (such as thermomechanical pulp, refiner ground pulp, powdered pulp, etc.), waste paper pulp, and the like.

In the composition of this invention, the amount of the ligneous pulp based on the intimate mixture containing the acetal resin and the ligneous pulp is preferably 10 to 70% by weight, more preferably 20 to 60% by weight.

When the amount of the ligneous pulp is less than 10% by weight, it is unexpectable to obtain a sufficient effect on inhibition and prevention of the dripping phenomenon, and the effect on the imparting of fire retardancy is also insufficient. When the above amount is more than 70% by weight, it is difficult to mix these components, and in some cases, no homogeneous resin composition can be obtained.

In the composition of this invention, the amount of the acetal resin based on the same standard as above is preferably 30 to 90% by weight, more preferably 40 to 80% by weight.

In the composition of this invention, the intimate mixture containing the acetal resin and the ligneous pulp can be produced, for example, by homogeneously dispersing or mixing these components, while the acetal resin is melted under heat, with a known kneader, extruder, Banbury mixer, or the like according to a known method.

When the above components as starting materials are mixed, the mixing order, etc., are not specially limited, and are arbitrary as far as they are not against common knowledge of plastic processing techniques.

Various additives may be incorporated, as required, into the resin composition of this invention. In particular, for example, a triazine compound or a melamine compound is effective for improving the rigidity and strength of the acetal resin composition. Preferred as a triazine compound and a melamine compound are those which are disclosed in Japanese Patent Publications Nos. 49339/90 and 49340/90. The amount of the triazine compound or the melamine compound contained in the composition of this invention is preferably 0.5 to 5% by weight, more preferably 1 to 3% by weight.

Examples of other additives are thermal stabilizers and antioxidants such as an organic phosphorous ester, sterically hindered phenols, etc., an ultraviolet light absorber such as a benzotriazole or hindered amine type, inorganic fillers such as glass powder, talc, mica, etc., fibrous reinforcing materials such as glass fiber, carbon fiber, etc., colorants, lubricants, antistatic agents, and the like.

The effects of this invention will be specifically detailed hereinafter by reference to Examples and Comparative Examples. The following Examples are intended to explain this invention specifically but not intended to limit the working mode and scope of this invention.

EXAMPLE 1

A Banbury type pressure kneader (capacity 10 lit., main screw revolution rate 26 rpm, motor 40 HP, supplied by Toshin Co., Ltd.) was charged with 70 parts by weight (2.1 kg) of an acetal resin (trade name, IUPITAL F30-01, supplied by Mitsubishi Gas Chemical Company, Inc.) and 30 parts by weight (0.9 kg) of bleached kraft pulp (supplied by Oji Paper Co., Ltd.). These components were kneaded under a pressure of 6.5 kg/cm$^2$.G at a temperature of 190° to 210° C. for 20 minutes thereby to form a compound, and the compound was pelletized. Then, the resultant pellet was injection-molded in a customary manner to prepare test pieces for physical property measurements.

The test results are shown in Table 1.

EXAMPLE 2

Example 1 was repeated except for the use of 1 part by weight of 2,4-diamino-sym-triazine and 1 part by weight of melamine in addition to an acetal resin and bleached kraft pulp, whereby the results shown in Table 1 were obtained.

EXAMPLE 3

Example 2 was repeated except that the amount of the acetal resin was changed from 70 parts by weight to 90 parts by weight and the amount of the bleached kraft pulp was changed from 30 parts by weight to 10 parts by weight, whereby the results shown in Table 1 were obtained.

EXAMPLE 4

Example 2 was repeated except that the amount of the acetal resin was changed from 70 parts by weight to 60 parts by weight and the amount of the bleached kraft pulp was changed from 30 parts by weight to 40 parts by weight, whereby the results shown in Table 1 were obtained.

EXAMPLE 5

Example 2 was repeated except that the amount of the acetal resin was changed from 70 parts by weight to 50 parts by weight and the amount of the bleached kraft pulp was changed from 30 parts by weight to 50 parts by weight, whereby the results shown in Table 1 were obtained.

EXAMPLE 6

Example 2 was repeated except that the amount of the acetal resin was changed from 70 parts by weight to 40 parts by weight and the amount of the bleached kraft pulp was changed from 30 parts by weight to 60 parts by weight, whereby the results shown in Table 1 were obtained.

EXAMPLE 7

Example 2 was repeated except that the amount of the 2,4-diamino-sym-triazine was changed from 1 part by weight to 3 parts by weight and the amount of the melamine was changed from 1 part by weight to 3 parts by weight, whereby the results shown in Table 1 were obtained.

COMPARATIVE EXAMPLE 1

Test pieces were prepared by repeating Example 1 except for the use of 100 parts by weight of an acetal resin alone without any bleached kraft pulp, and subjected to physical property tests, whereby the results shown in Table 1 were obtained.

COMPARATIVE EXAMPLE 2

Example 2 was repeated except for the use of 100 parts by weight of an acetal resin alone without any bleached kraft pulp, whereby the results shown in Table 1 were obtained.

COMPARATIVE EXAMPLE 3

Example 2 was repeated except that the amount of the acetal resin was changed from 70 parts by weight to 95 parts by weight and the amount of the bleached kraft pulp was changed from 30 parts by weight to 5 parts by weight, whereby the results shown in Table 1 were obtained.

COMPARATIVE EXAMPLE 4

Example 4 was repeated except that 40 parts by weight of the bleached kraft pulp was changed to 40 parts by weight of a glass fiber (trade name, GLASRON, supplied by Asahi Fiber Glass Co., Ltd.), whereby the results shown in Table 1 were obtained.

COMPARATIVE EXAMPLE 5

Example 5 was repeated except that 50 parts by weight of the bleached kraft pulp was changed to 50 parts by weight of a glass fiber, whereby the results shown in Table 1 were obtained.

COMPARATIVE EXAMPLE 6

Example 4 was repeated except that 40 parts by weight of the bleached kraft pulp was changed to 40 parts by weight of a potassium titanate fiber (trade name, TISMO D-102, supplied by Otsuka Chemical Co., Ltd.), whereby the results shown in Table 1 were obtained.

TABLE 1

|  | Proportions (part by weight) | | | | | | Combustibility[*1] | | Flexural strength[*2] $kg/cm^2$ | Flexural modulus[*2] $kg/cm^2$ | Thermal deformation temperature[*3] °C. |
|---|---|---|---|---|---|---|---|---|---|---|---|
|  | Poly- acetal resin | Pulp | Glass fiber | Potassium titanate fiber | 2,4-di- amino-sym- triazine | Mela- mine | Dripping | Combustion rate mm/min | | | |
| Ex. 1 | 70 | 30 | 0 | 0 | 0 | 0 | No | 20 | 1,180 | 47,000 | 157 |
| Ex. 2 | 70 | 30 | 0 | 0 | 1 | 1 | No | 20 | 1,210 | 49,400 | 157 |
| Ex. 3 | 90 | 10 | 0 | 0 | 1 | 1 | Yes | 23 | 1,010 | 36,000 | 150 |
| Ex. 4 | 60 | 40 | 0 | 0 | 1 | 1 | No | 12 | 1,283 | 59,300 | 159 |
| Ex. 5 | 50 | 50 | 0 | 0 | 1 | 1 | No | 9 | 1,250 | 67,500 | 158 |
| Ex. 6 | 40 | 60 | 0 | 0 | 1 | 1 | No | 6 | 1,255 | 69,000 | 159 |
| Ex. 7 | 70 | 30 | 0 | 0 | 3 | 3 | No | 18 | 1,240 | 50,000 | 157 |
| CEx. 1 | 100 | 0 | 0 | 0 | 0 | 0 | Extremely | 25 | 830 | 25,200 | 108 |
| CEx. 2 | 100 | 0 | 0 | 0 | 1 | 1 | Extremely | 25 | 825 | 25,000 | 107 |
| CEx. 3 | 95 | 5 | 0 | 0 | 1 | 1 | Yes | 24 | 900 | 29,000 | 135 |
| CEx. 4 | 60 | 0 | 40 | 0 | 1 | 1 | Extremely | 25 | 2,150 | 120,400 | 160 |
| CEx. 5 | 50 | 0 | 50 | 0 | 1 | 1 | Extremely | 24 | 2,190 | 128,000 | 160 |
| CEx. 6 | 60 | 0 | 0 | 40 | 1 | 1 | Extremely | 25 | 1,700 | 90,000 | 158 |

Note: [*1] UL-94HB method, 12 mm width and 3.2 mm thickness
[*2] ASTM D790, 23° C.
[*3] ASTM D648, 18.6 kg/cm² load The compound using ligneous pulp as a component or filler, specified by this invention, can provide an acetal resin composition having stable mechanical properties, excellent heat resistance and good fire retardancy.

What is claimed is:

1. An acetal resin composition consisting essentially of an intimate mixture of an acetal resin, as the sole resin, and ligneous pulp.

2. The acetal composition of claim 1 in which the intimate mixture contains 10 to 70% by weight of the ligneous pulp, based on the weight of the intimate mixture.

3. An acetal resin composition consisting essentially of an intimate mixture of an acetal resin and ligneous pulp.

4. The acetal composition of claim 3 in which the intimate mixture contains 10 to 70% by weight of the ligneous pulp, based on the weight of the intimate mixture.

5. An acetal resin composition which is prepared by homogeneously dispersing or mixing an acetal resin and ligneous pulp while the acetal resin is melted under heat, and which composition consists essentially of an intimate mixture of an acetal resin, as the sole resin, and ligneous pulp.

* * * * *